(12) United States Patent
Henderson et al.

(10) Patent No.: US 8,951,339 B2
(45) Date of Patent: Feb. 10, 2015

(54) COMPRESSED GAS DRYING SYSTEM

(71) Applicant: Henderson Engineering Company, Inc., Sandwich, IL (US)

(72) Inventors: Terry D. Henderson, Naperville, IL (US); Charles A. Henderson, Wheaton, IL (US)

(73) Assignee: Henderson Engineering Company, Inc., Sandwich, IL (US)

( * ) Notice: Subject to any disclaimer, the term of this patent is extended or adjusted under 35 U.S.C. 154(b) by 159 days.

(21) Appl. No.: 13/657,422

(22) Filed: Oct. 22, 2012

(65) Prior Publication Data

US 2013/0098476 A1    Apr. 25, 2013

Related U.S. Application Data

(60) Provisional application No. 61/549,985, filed on Oct. 21, 2011.

(51) Int. Cl.
*B01D 53/04* (2006.01)
*B01D 53/26* (2006.01)
*F16K 49/00* (2006.01)

(52) U.S. Cl.
CPC ................................. *F16K 49/00* (2013.01)
USPC .............. 96/110; 96/122; 96/128; 96/144; 417/43

(58) Field of Classification Search
USPC .......... 96/109, 110, 121, 122, 126–128, 144; 55/DIG. 17; 95/23, 117; 417/43, 244; 34/472, 473, 80
See application file for complete search history.

(56) References Cited

U.S. PATENT DOCUMENTS

| | | | | |
|---|---|---|---|---|
| 5,213,593 | A * | 5/1993 | White, Jr. ........................... | 95/99 |
| 5,968,234 | A * | 10/1999 | Midgett et al. ................... | 95/120 |
| 6,221,130 | B1 * | 4/2001 | Kolodziej et al. ................ | 95/41 |
| 6,375,722 | B1 * | 4/2002 | Henderson et al. ............. | 96/112 |
| RE39,122 | E | 6/2006 | Henderson et al. | |
| 7,070,393 | B2 * | 7/2006 | Vertriest ......................... | 417/43 |
| 7,757,407 | B2 | 7/2010 | Vanderstraten et al. | |
| 8,647,409 | B2 * | 2/2014 | Hashi et al. ...................... | 95/41 |
| 2012/0222549 | A1 * | 9/2012 | Vermeer .......................... | 95/41 |

FOREIGN PATENT DOCUMENTS

EP         1249603 A2 * 10/2002
WO  WO 2011/050423 A2 *  5/2011

OTHER PUBLICATIONS

Machine generated English translation of EP 1249603 A2, published Oct. 2002.*
Atlas Copco, Quality Air Solutions XD Series, date unknown.

* cited by examiner

*Primary Examiner* — Frank Lawrence
(74) *Attorney, Agent, or Firm* — Clark Hill PLC

(57) ABSTRACT

A system for compressing and drying a gas generally includes a compressor having multiple stages of compression and a dryer. The compressor includes a first heat exchanger and an after-cooler each of which utilizes a fan. A sensor is provided downstream of the after-cooler. The fan and sensor are in communication with the controller. A final stage compressed gas outlet of the compressor provides hot compressed gas to the regenerative portion of the dryer. Utilization of the final stage compressed gas for regeneration while also utilizing the compressor's after-cooler provides gas which is sufficiently hot to regenerate desiccant in the dryer and allows the communication between the sensor, the controller and compressors to remain intact.

10 Claims, 3 Drawing Sheets

COMPRESSED GAS DRYING SYSTEM

FIELD OF THE INVENTION

The field of the invention relates to a system for compressing and drying gas.

BACKGROUND OF THE INVENTION

Compressed gas is a used throughout many industries. As a result of the compression process, the temperature of the gas is increased and the dew point level of the gas is increased. In order to be usable, however, the compressed gas must be dried and cooled to an acceptable level.

Two types of gas compressors are oil-free rotary screw or centrifugal. A rotary screw type compressor typically utilizes two stages of compression and a centrifugal compressor typically utilizes two to four stages of compression. Each stage of compression consists of a means of increasing the pressure of a given volume of gas. A moisture separator and a heat exchanger. The separator removes moisture which results from the compression process and the heat exchanger reduces the temperature of the newly compressed gas. At the discharge of the final stage of compression a heat exchanger, often termed an "after-cooler", is provided in order to lower the temperature of the compressed gas to a suitable level. This cooled compressed gas is then provided to a dryer to achieve a suitable dew point level to allow utilization of the compressed gas.

In today's economy, industry strives to find the most energy efficient equipment available. Heat-of-compression dryers have been utilized for many years and are capable of delivering high quality compressed gas with the very low energy consumption. The high level of efficiency provided by heat-of-compression dryers is possible because these dryers utilize the heat which results from the gas compression process. An example of a heat-of-compression dryer is described in U.S. Pat. No. RE 39,122.

As shown in U.S. Pat. No. RE 39,122 the heat-of-compression dryer 20 includes two towers of desiccant 48, 60 and is utilized with a compressor 22. The compressor 22 includes an inter-stage compressed gas outlet which is connected to the dryer 20. The dryer 20 is connected to the compressor 22 immediately downstream of the first stage of compression, providing inter-stage compressed gas to the dryer in order to regenerate desiccant in the dryer 20. The dryer 20 is also connected downstream of the a heat exchanger 28 in order to provide cooled gas to the dryer where the gas is to be dried for consumption. Valves are provided to set different modes of operation of the dryer. In one mode of operation the first tower of desiccant is "on-line" and receives gas from the heat exchanger to dry the gas to the desired dew point prior to utilization. At the same time, the second tower is "off-line" and receives inter stage gas provided by the first stage of compression of the compressor 22. This inter stage gas regenerates the desiccant in the second tower so that the desiccant is available to dry the gas when the second tower goes "on-line". When the desiccant in the first tower becomes saturated, the valves are utilized to place the second tower "on-line" and to place the first tower "off-line" for regeneration. In certain instances, the inter stage compressed gas does not provide sufficient heat to regenerate the desiccant in the tower. In these instances, use of the heat of compression dryer is impractical.

In order for the heat-of-compression dryer to operate, sufficient heat must be created during the compression stage to regenerate the desiccant. In some instances, sufficient heat is created only at the final stage of compression to regenerate the desiccant. A prior art system which utilizes final stage compressed gas to regenerate the desiccant is illustrated in attached FIG. 1. The system includes a compressor 70 and a heat-of-compression gas dryer 72. The compressor 70 includes a first stage compressor 74, a first stage heat exchanger 76, a second stage compressor 78, and an after-cooler 80. The compressor further includes a source inlet 82, and a compressed gas outlet 84.

The dryer 72 includes a first desiccant tower 86, a second desiccant tower 88, and a heat exchanger 90. The dryer further includes pipes and valves to connect various components of the dryer 72 and to direct the gas flow through the dryer 72 as desired. The dryer further still includes a wet gas inlet 92 and a dry gas outlet 94.

Because gas exiting the after-cooler 80 does not have sufficient heat to regenerate the desiccant in the heat-of-compression dryer, as illustrated in FIG. 1 the pipe 96 connecting the second stage compressor 78 to the after-cooler 80 has been removed and the pipe 98 connecting the after-cooler 80 to the compressed gas outlet 84 has been removed. The removal of these connections renders the after-cooler 80 inactive. The wet gas inlet 92 of the dryer 72 is connected to the compressed gas outlet 84 of the compressor 70 to provide the wet compressed gas from the compressor 70 to the heat-of-compression dryer 72. The desiccant towers 88, 86 are cycled "on-line" and "off-line". When the first desiccant tower 86 is "on-line", for example, the hot compressed gas from the final stage of compressor 78 is provided to the heat-of-compression dryer 72 and the valves are opened and closed as necessary to first direct the gas through the second desiccant tower 88 where it is used to regenerate the desiccant in the second/"off-line" tower 88 of the dryer 72. After exiting the second tower 88, the gas is provided to the first/"on-line" desiccant tower 86 where it is dried to an acceptable dew point. As noted above, the gas at the dry air outlet 94 which is provided for consumption must also be provided at an acceptable temperature. The temperature of the gas exiting the second desiccant tower 88 must therefore be reduced. Thus, upon exiting the second desiccant 88 tower and prior to entering the first desiccant tower 86, the hot gas is provided to a heat exchanger 90 which has been incorporated into the heat-of-compression dryer 72 to cool the gas to the appropriate temperature before being passed to the first desiccant tower 86 (i.e. the "on-line" tower) of the dryer. As the gas is passed through the first desiccant tower 86, the gas is dried to the appropriate dew point necessary for downstream consumption at the dryer outlet 94.

Because the compressor 70 is utilized in a variety of systems wherein the after-cooler 80 is required, manufacture of the compressor 70 without the after-cooler 80 is not practical or cost effective. Likewise, removal of the after-cooler 80 associated with the compressor 70 and incorporation of a heat exchanger 90 into the dryer 72 is not only time consuming but also adds significant cost to the system as two heat exchangers 80, 90 are provided but only one heat exchanger 90 is utilized.

In addition to the increased costs, in some instances, removal of the after-cooler from the compressor is not practical due to the controls associated with the compressor. For example, in some instances the air-cooled after-cooler and the first stage heat exchanger of the compressor utilize a fan(s) to remove heat from the compressed gas. The fan(s) are often controlled by a single control signal. As a result, the after-cooler cannot be removed without impacting the controls associated with the fans of the remaining heat exchanger. Another difficulty is that many energy efficient gas compressors, for example rotary screw compressors, utilize variable speed drives to match the speed of the compressor's motor to the required gas consumption/gas flow. A gas flow sensor at the output of the after-cooler senses the volume of gas flow and a control signal is provided in response to the sensed volume to increase or decrease the drive speed of the compressor's motors thereby matching the increase or decrease in the demand for compressed gas. Because the sensor is located downstream of the after-cooler, the after-cooler cannot be removed without impacting the variable speed drive controls.

A gas drying device which utilizes a cooler to decrease the temperature of the air to be dried is described in U.S. Pat. No. 7,757,407 ("the '407 Patent") and has been assigned to Atlas Copco Airpower. This system includes two dryers, a cooling dryer 1 and a desiccant dryer 2. The desiccant dryer 2 of the '407 Patent is not a dual desiccant tower dryer. Rather, the desiccant dryer 2 of the '407 Patent includes a pressure tank 4 with a drying zone 5 and a regeneration zone 6 with an adsorption and/or absorption medium 7. The medium 7 is alternately guided through the drying zone 5 and the regeneration zone 6. A portion of the gas compressed by the compressor 3 is provided to the cooling dryer 1 to lower the temperature of the compressed gas and a portion of the gas compressed by the compressor 3 is provided to the desiccant dryer 2 to regenerate the wet medium 7 in the regeneration zone 6. These portions are then mixed together and provided to the medium 7 in the drying zone 5 to lower the dew point of the gas.

In addition, to the fact that the Atlas Copco system incorporates not one but two dryers, because only a portion of "hot" gas provided by compression is utilized to regenerate the desiccant of the dryer 2, a substantial amount of time is required to regenerate the desiccant in the dryer 2 and as a result this system does not provide adequate adsorption to meet the dew points demands required by many compressed gas systems. Furthermore, the portion of the gas provided to the regeneration zone 6 is not cooled prior to flowing through the drying zone 5. The temperature of the desiccant in the drying zone 5 is therefore increased resulting in a decrease in drying efficiency. Finally, the temperature of the gas provided for consumption is increased due to the mixture of the hot gas exiting the regeneration zone with the cooler gas provided to the drying zone.

Accordingly, a need exists for a heat-of-compression compressed gas dryer system which allows for the final stage compressed gas to be provided to the dryer in order to regenerate the desiccant, which provides for cooling of the entire flow of compressed gas prior to drying, and which does not negatively impact the controls associated with the compressor.

SUMMARY OF THE INVENTION

The present invention provides a system for compressing and drying a gas from a source. The compressor of the system provides a compressed gas outlet and a compressed gas inlet for connection to the regeneration portion of the dryer. The compressor also includes an after-cooler which receives gas from the compressed gas inlet and delivers cooled gas to the drying portion of the dryer. Because the after-cooler of the compressor is utilized, the cost of providing an additional heat exchanger is avoided. In addition, leaving the after-cooler in place within the compressor avoids disruption to the common controls and the sensors which are provided downstream of the after-cooler.

DETAILED DESCRIPTION OF PREFERRED EMBODIMENTS

Figure 1:
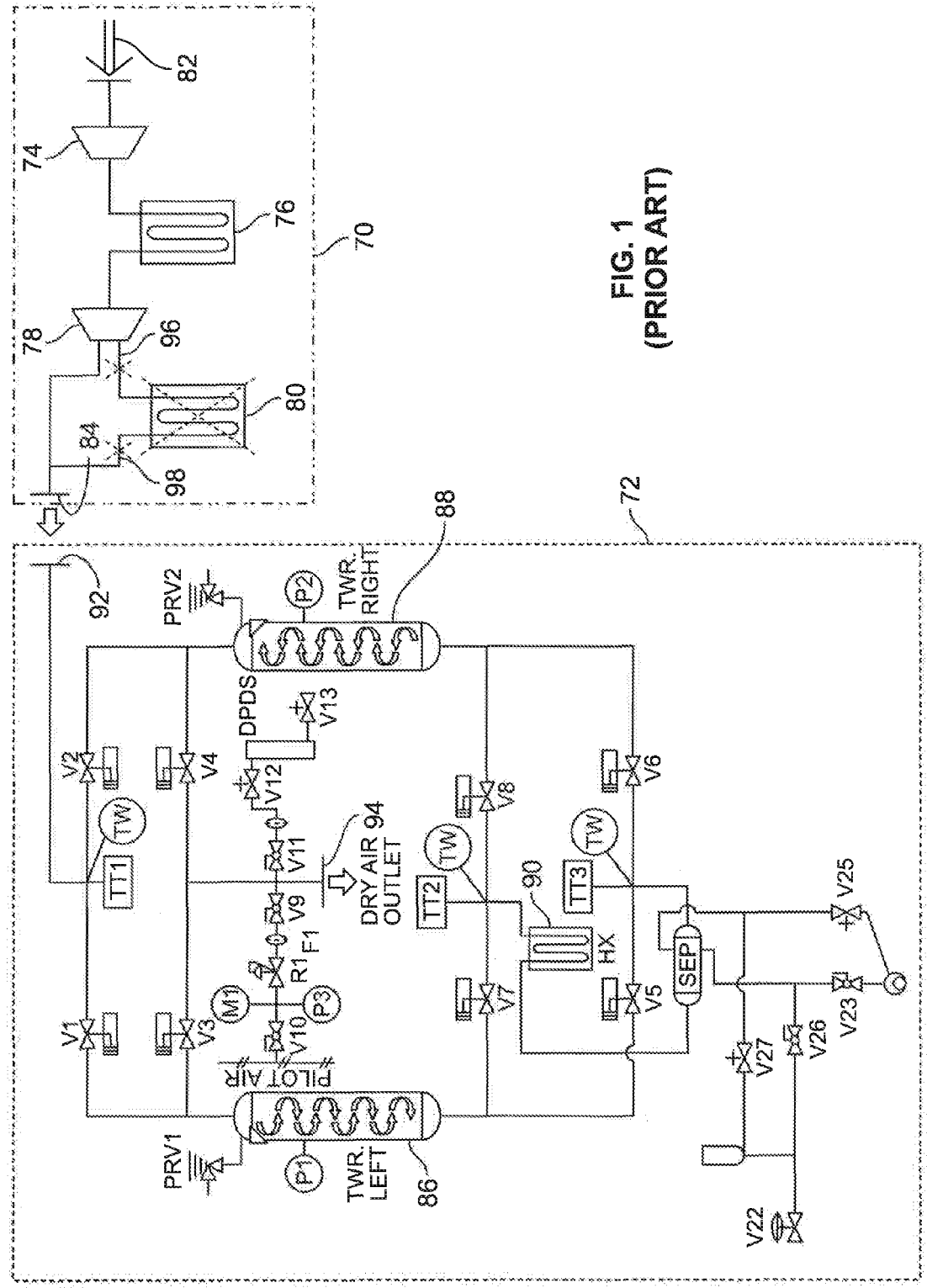
FIG. 1 illustrates a prior art compressed gas dryer system.

While the present invention is susceptible of embodiment in various forms, as shown in the drawings, hereinafter will be described the presently preferred embodiments of the invention with the understanding that the present disclosure is to be considered as an exemplification of the invention, and is not intended to limit the invention to specific embodiments illustrated.

Figure 2:
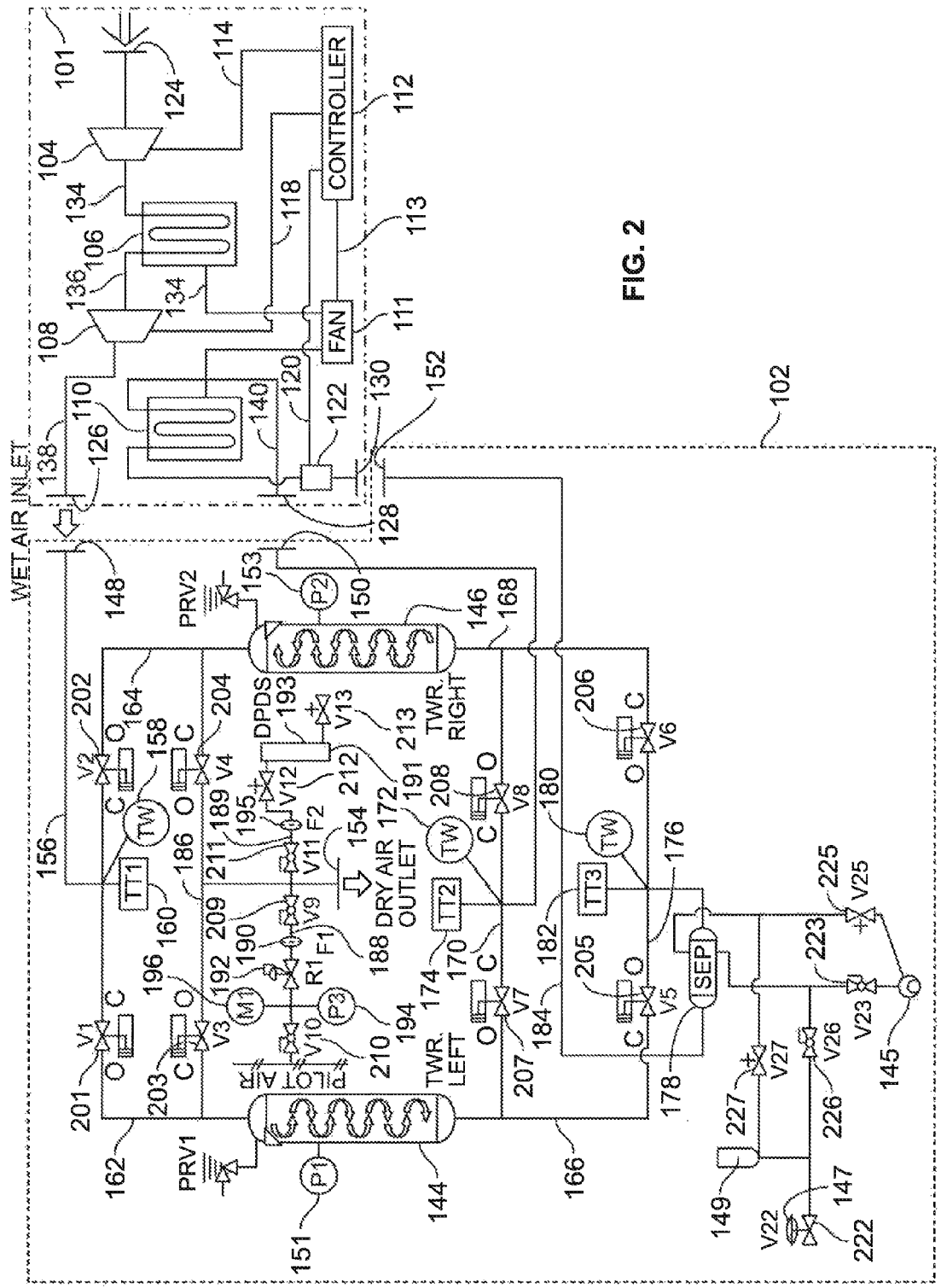
FIG. 2 illustrates a first embodiment of the compressed gas dryer system of the present invention.

A first embodiment of the compressed gas system is illustrated in FIG. 2. The system generally includes a compressor 101 and a dryer 102.

The compressor 101 may be for example, a rotary screw or centrifugal compressor, and is a multi-stage compressor. The compressor 101 generally includes a first stage compressor 104, a first stage heat exchanger 106, a final stage compressor 108, an after-cooler 110, a fan 111, and a controller 112. The fan 111 is operatively associated with the first heat exchanger 106 and the after-cooler 110 to remove heat from the compressor 101. The controller 112 is in electrical communication with the first stage compressor 104 via communication line 114; the final stage compressor 108 via communication line 118; and the fan 111 via communication line 113. The compressor 101 further includes a sensor 122 connected downstream of the after-cooler 110. The controller 112 is in electrical communication with the sensor 122 via communication line 120. The compressor 101 further includes a source inlet 124, a hot gas outlet 126, a hot gas inlet 128, and a cooled gas outlet 130.

The source inlet 124 is connected to the first stage compressor 104 by line 132; the first stage compressor 104 is connected to the first heat exchanger 106 by line 134, the first heat exchanger 106 is connected to the final stage compressor 108 by line 136; the final stage compressor 108 is connected to the compressed gas outlet 126 by line 138. The hot gas inlet 128 is connected to the after-cooler 110 by line 140 and the after-cooler 110 is connected to the cooled gas outlet 130 by line 142.

The dryer 102 generally includes a first desiccant tower 144, a second desiccant tower 146, a hot gas inlet 148, a hot gas outlet 150, a cooled gas inlet 152 and a dry gas outlet 154. The hot gas inlet 148 of the dryer 102 is connected to the hot gas outlet of the compressor 101; the hot gas outlet 150 of the dryer 102 is connected to the hot gas inlet 128 of the compressor 101; and the cooled gas inlet 152 of the dryer 102 is connected to the cooled gas outlet 130 of the compressor 101.

A plurality of lines and valves are provided between the different elements of the dryer to direct the gas as desired through the dryer 102. Line 156 connects the hot gas inlet 148 to inlet switching valve 201 and inlet switching valve 202. A thermowell 158 and dryer inlet temperature transmitter 160 are provided along line 156. Line 162 is provided from valve 201 to a first end of the first desiccant tower 144 and outlet switching valve 203. Line 164 is provided from valve 202 to a first end of the second desiccant tower 146 and outlet switching valve 204. Line 166 is provided from the second end of the first desiccant tower 144 to cool return switching valve 205 and cooler supply switching valve 207. Line 168 is provided from the second end of the second desiccant tower 146 to cool return switching valve 206 and cooler supply switching valve 208. Line 170 is provided from cool supply switching valve 207 to cool supply switching valve 208 and thermowell 172 and cooler inlet temperature transmitter 174 are provided along line 170. Line 176 is provided from valve 205 to valve 206, and to moisture separator 178. A thermowell 180 and a cooler outlet temperature transmitter 182 are provided along line 176. Line 184 extends from the cooled gas inlet 152 to the moisture separator 178.

Line 186 extends to valve 203, to valve 204, to pilot gas filter isolation valve 209, to dew point demand system valve 211 and to the dry gas outlet 154. Line 188 extends from pilot gas filter isolation valve 209 to pilot gas filter isolation valve 210. A pilot gas filter 190, a pilot gas regulator 192, a pilot gas pressure gauge 194, and a moisture indicator 196 are provided along line 188. Line 189 extends from dew point demand system valve 211 to the dew point demand system 191. The dew point demand system 191 includes a probe 193 and probe isolation valves 212 and 213. An inline filter 195 is provided along line 189.

The dryer 102 further includes a primary drain 145, a secondary drain 147, a secondary drain valve 222, a primary drain block valve 223, a drain equalizing shut off valve 225, a liquid level switch 149, a secondary drain valve block valve 226, and a liquid level equalization shut off valve 227. A pressure relief valve 151, 153 is associated with each desiccant tower.

Operation of the system 100 is as follows. In the event the first desiccant tower 144 is wet and the second desiccant tower 146 is dry, operation of the system will begin by opening and closing the appropriate valves to place the first desiccant tower 144 "off-line" for regeneration of the desiccant and to place the second desiccant tower 146 "on-line" for drying of the gas which is to be consumed. Source gas is provided to the source inlet 124 of the compressor 101 and then provided to the first stage compressor 104 where it is compressed. The gas is then provided to the first stage heat exchanger 106 where it is cooled and provided to the final stage compressor 108. After compression by the final stage compressor 108, the gas is provided to the hot gas outlet 126 of the compressor. The fan 111 is connected to the first stage compressor 104 and the final stage compressor 108 to remove heat associated with the first heat exchanger 106 and the after-cooler 110 from the compressor 101. The controller 112 is in communication with the fan 111 to control operation of the fan 111. Hot compressed gas at the hot gas outlet 126 is provided to the hot gas inlet 148 of the dryer 102.

Gas enters the dryer 102 at the hot gas inlet 148. With the first desiccant tower 144 off line, valve 201 is open and valve 202 is closed, thereby providing a path from the hot gas inlet 148 to the first desiccant tower 144 for the gas to flow. The gas flows through the first desiccant tower 144 to regenerate the desiccant therein. The gas then passes through valve 207 and to the hot gas outlet 150 of the dryer via line 170. The gas is then provided from the hot gas outlet 150 of the dryer 102 to the hot gas inlet 128 of the compressor 101 to return the hot gas to the compressor 101.

From the hot gas inlet 128 of the compressor, the gas is provided to the after-cooler 110 where the temperature of the gas is lowered to the temperature desired for consumption of the gas. The gas exits the after-cooler 110 and flows through the sensor 122 before being provided to the cooled gas outlet 130 of the compressor 101. As gas flows through the sensor 122, a demand signal is provided via line 120 to the controller 112 which provides an indication of the volume of gas flowing through the sensor 122. In response to the demand signal, the controller 122 provides drive signals via lines 114, 118 to the compressors 104, 108, to adjust the output of the compressors 104, 108 in accordance with the demand signal. Gas exiting the sensor 122 is provided to the cooled gas outlet 130 and then to the attached dryer 102 at the cooled gas inlet 152.

Cooled gas provided at the inlet 152 of the dryer then passes through moisture separator 178, through valve 206, and to the second desiccant tower 146. As the gas passes through the second desiccant tower 146, moisture is removed from the gas to achieve the desired dew point for the consumption of the gas. The dried gas exiting the second desiccant tower 146 is provided to the dry gas outlet 154 where it is ready for consumption via line 164 and valve 204.

Operation of the system 100 continues as described above until it is determined that the desiccant in the second desiccant tower 146 requires regeneration and therefore the valves of the system 100 are to be positioned to allow the first desiccant tower 144 to operate in the "on-line" state and the second desiccant tower 146 to operate in the "off-line" state. This determination may be made, for example, based upon the duration of time in operation, for example, thirty minutes. Alternatively, characteristics of the gas may be monitored to determine the appropriate time to switch the state of the desiccant towers 144, 146. When appropriate, the appropriate valves are closed and the appropriate valves are opened to place the first desiccant tower 144 on-line and the second desiccant tower 146 off-line.

Figure 3:
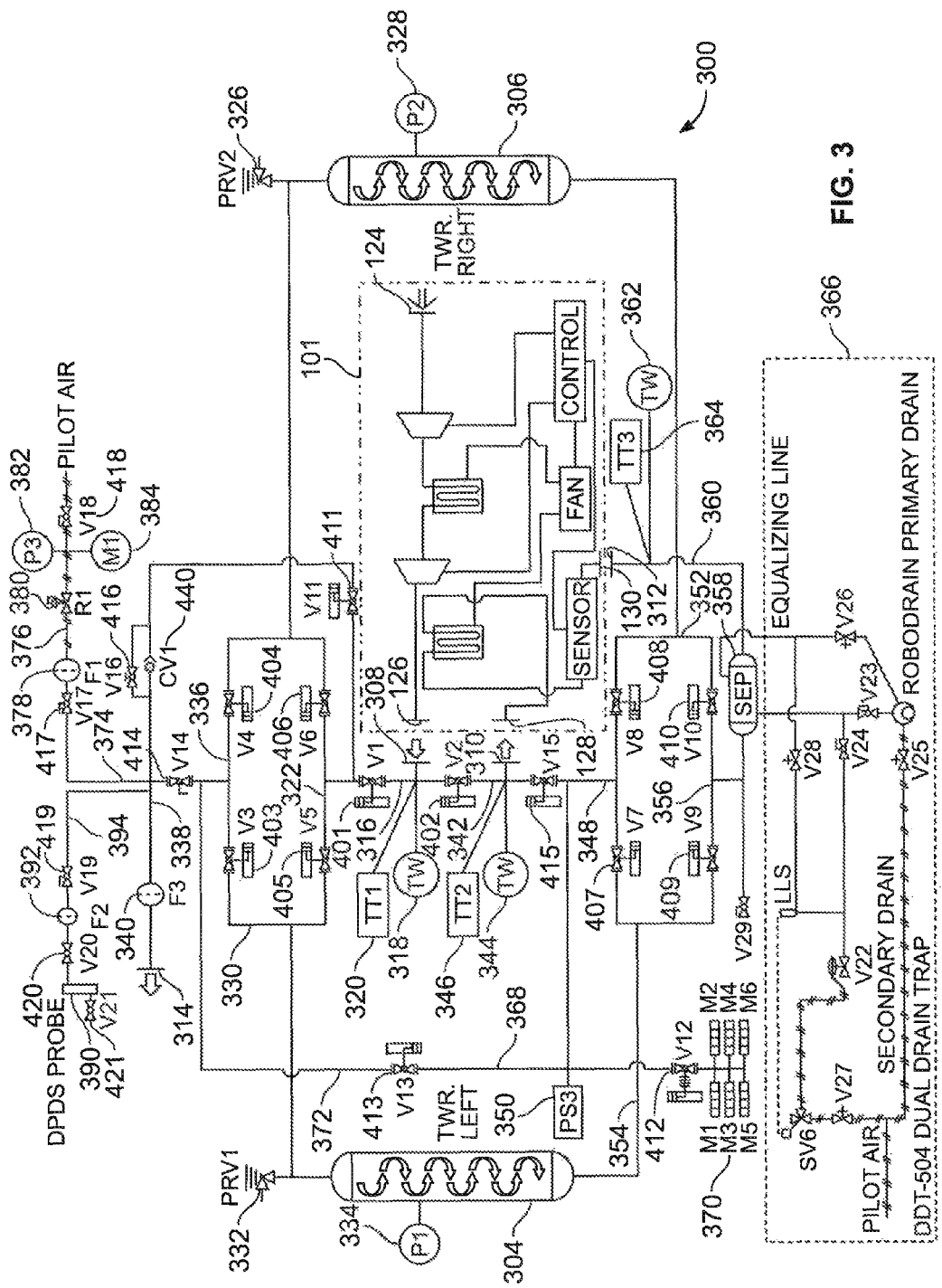
FIG. 3 illustrates a second embodiment of the compressed gas dryer system of the present invention.

A system 300 illustrates a second embodiment of the system of the present invention and is illustrated in FIG. 3. The compressed gas system 300 generally includes a compressor 101 and a dryer 302.

The compressor 101 of the system 300 is identical to the compressor 101 of the system 100 illustrated in FIG. 2.

The dryer 302 is a regenerative dryer. The dryer 302 generally includes a first desiccant tower 304, a second desiccant tower 306, a hot gas inlet 308, a hot gas outlet 310, a cooled gas inlet 312 and a dry gas outlet 314. The hot gas inlet 308 of the dryer 302 is connected to the hot gas outlet of the compressor 101; the hot gas outlet 310 of the dryer 302 is connected to the hot gas inlet 128 of the compressor 101; and the cooled gas inlet 312 of the dryer 302 is connected to the cooled gas outlet 130 of the compressor 101.

The dryer utilizes heat-of-compression provided by the compressor 101 to regenerate the desiccant in each tower 304, 306. A plurality of lines and valves are provided between the different elements of the dryer to direct the gas as desired through the dryer 302.

Line 316 connects the hot gas inlet 308 to inlet switching valve 401 and inlet switching valve 402. A thermowell 318 and dryer inlet temperature transmitter 320 are provided along line 316. Line 322 is provided from valve 401 to valves 405 and 406. Line 324 extends from valve 406 to valve 404 and to the first end of the second desiccant tower 306. A pressure relief valve 326 and a pressure gauge 328 are provided in communication with the second desiccant tower 306. Line 330 extends from valve 405 to valve 403 and to the first end of the first desiccant tower 304. A pressure relief valve 332 and pressure gauge 334 is provided in communication with the first desiccant tower 304. Line 336 extends from valve 403 to valve 404 and to cooling flow inducing valve 414. Line 338 extends from valve 414 to the dry gas outlet 314. An after filter 340 is provided along line 338 upstream of the dry gas outlet 314. Line 338 also extends from valve 214 to final stripping/cooling return valve 411. A cooling return check valve 440 is provided along line 338 upstream of valve 411 and a final stripping flow adjustment valve 416 is placed in parallel with the check valve 440.

Line 342 extends from valve 402 to a stripping/cooling switch valve 415 and to the hot gas outlet 310. A thermowell 344 and cooler inlet temperature transmitter 346 are provided in communication with line 342. Line 348 extends from valve 415 to valve 407 and to valve 408. A pressure switch 350 is provided in communication with line 348. Line 352 extends from valve 408 to a second end of the second desiccant tower 306. Line 352 also extends to valve 410. Line 354 extends from valve 407 to the second end of the first desiccant tower 304. Line 356 extends from valve 409 to valve 410 and to separator 358. A drain valve 429 is positioned along line 356. Line 360 extends from the cooled gas inlet 312 to the separator 358. A thermowell 362 and a cooler outlet temperature transmitter 364 are provided along line 360. A drain system 366 is provided in communication with the separator 358.

Line 368 extends from line 348 to cooling flow supply valve 413 and to stripping flow exhaust valve 412. Exhaust mufflers 370 are provided downstream of the exhaust valve 412. Line 372 extends from valve 413 to cooling flow inducing valve 414. Line 374 extends from cooling flow inducing valve 414 to pilot gas shut off valve 417. Line 376 extends from valve 417 to pilot gas block valve 418. A pilot gas filter 378, a pressure regulator 380, a pilot gas pressure gauge 382, and a moisture indictor 384 are provided along line 376.

A dew point demand system is provided by a dew point demand system probe 390, an in line filter 392, a shut off valve 419, a probe block valve 420 and a bleed valve 421. Gas flow is provided to the dew point demand system via line 394 which is in communication with line 338.

Operation of the system 300 also provides for each desiccant tower 304, 306 to be placed "on-line" for drying the gas and "off-line" for desiccant regeneration. Operation of the system 300 varies from operation of the system 100 illustrated in FIG. 2 in that regeneration of the desiccant in the off-line tower includes three cycles; a regeneration mode, a stripping mode, and a cooling mode.

In the event the first desiccant tower 304 is wet and the second desiccant tower 306 is dry, operation of the system 300 begins by opening the appropriate valves and closing the appropriate valves to place the first desiccant tower 304 off-line for regeneration of the desiccant in the first tower 304 and to place the second desiccant tower 306 on-line for drying of the gas to be consumed, this mode of operation is referred to as the regeneration mode.

Source gas is provided to the source inlet 124 of the compressor and the compressor 101 operates in the same manner as described above. Hot compressed gas at the hot gas outlet 126 is provided to the hot gas inlet 308 of the dryer 302.

Gas enters the dryer 302 at the hot gas inlet 308, with the first desiccant tower 304 off line, valves 401 and 405 are open and valves 402, 403 and 406 are closed, thereby providing a path for the hot gas to flow from the hot gas inlet 308 to the first desiccant tower 304 where the gas is utilized to regenerate the desiccant in the first tower 304. Upon exiting the first desiccant tower 304 the gas flows through valves 407 and 415 to the hot gas outlet 310 of the dryer 302. Gas exiting the hot gas outlet 310 is provided to the hot gas inlet 128 of the compressor 101 wherein it is then provided to the after-cooler 110.

The gas is cooled by the after-cooler 110 and exits the compressor 101 at the cooled gas outlet 130. Gas exiting the cooled gas outlet 130 is provided to the cooled gas inlet 312 of the dryer 302. Gas flows from the cooled gas inlet 312 of the dryer 302 to the moisture separator 358, through valve 410, and to the second desiccant tower 306. As the gas passes through the desiccant in the second desiccant tower 306, the gas is dried to the dew point level desired for consumption. The dried gas exits the second desiccant tower 306 and flows through valve 404, valve 414, filter 340, and to the dry gas outlet 314 of the dryer 302, where it is ready for consumption. The dryer is operated in this regeneration mode for a period of time, for example, approximately ninety minutes.

Before the first desiccant tower 304 is placed on-line, the stripping mode and/or a cooling mode may be utilized to further enhance the performance of the dryer 302. The appropriate valves are opened and the appropriate valves are closed to allow gas to flow through the system 300 to perform the stripping mode as described herein. During this stripping mode of operation, hot gas exits the hot gas outlet 126 and enters the compressed gas inlet 308 of the dryer 302. The hot compressed gas flows through valve 402 to the compressed hot gas outlet 310 of the dryer 302, to the hot gas inlet 128 of the compressor 101 where it is provided to the after-cooler 110. The gas is cooled by the after-cooler 110 and provided to the cooled gas outlet 130 of the compressor 101 and passed to the cooled gas inlet 312 of the dryer 302. The cooled compressed gas is then provided to the moisture separator 358 and to the second desiccant tower 306 via valve 410. As the gas flows through the second desiccant tower 306, the gas is dried. Upon exiting the second desiccant tower 306, the dried gas is provided to valve 404, to valve 414 and to the dry gas outlet 314 of the dryer via the filter 340. At line 338, a small adjustable portion of the dried gas is expanded to atmospheric pressure which further enhances its moisture removal capacity. This gas flows through valve 416, valve 411, valve 405, and to the first desiccant tower 304 where additional moisture is removed or "stripped" from the desiccant. Gas exiting the first desiccant tower 304 is provided to line 354, through valve 407, through line 348, and through valve 412 where it is vented to the atmosphere through mufflers 370 to reduce the noise level.

After the stripping mode of operation, the appropriate valves are opened and the appropriate valves are closed to allow gas to flow through the system to perform the cooling mode of operation as described herein. During this cooling mode, source gas is provided to the compressor 101 and hot compressed gas exits the compressor at the hot gas outlet 126. Hot gas from the outlet 126 of the compressor 101 is provided to the hot gas inlet 308 of the dryer 302 and through valve 402 to the compressed hot gas outlet 310 of the dryer 302, to the hot gas inlet 128 of the compressor 101 where it is provided to the after-cooler 110. The gas is cooled by the after-cooler 110 and provided to the cooled gas outlet 130 of the compressor and passed to the cooled gas inlet 312 of the dryer 302. The cooled compressed gas is then provided to the moisture separator 358 and to the second desiccant tower 306. As the gas flows through the second desiccant tower 306, the gas is dried. Upon exiting the second desiccant tower 306, the dried gas is provided to valve 404, to valve 414 and to the dry gas outlet 314 of the dryer 302 via the filter 340.

Valve 414 is a throttling valve which creates a small amount of pressure drop allowing a portion, for example approximately twenty percent, of the dry gas flowing through valve 414 to flow to valve 413 and valve 407. Gas flowing through valve 407 is provided to the first desiccant tower 304 to reduce the temperature of the desiccant in the first desiccant tower 304. Gas exists the desiccant tower 304, and flows through valve 405, valve 411 and check valve 440 where this portion of the gas rejoins the dry gas at line 338 and is provided to the dryer outlet 314. This cooling mode of operation is performed for a period of time, for example, sixty minutes.

The amount of the time designated for each mode of operation (i.e. the regeneration mode, the stripping mode, and the cooling mode) can be selected as desired to achieve the desired temperature and dew points of the gas provided at the dry gas outlet 314 of the dryer 302 for consumption. For example, operation of the system 302 may be designated so that the process is performed in approximately four hours.

The regeneration mode may be, for example, ninety minutes; the stripping mode may be, for example, ninety minutes; and the cooling mode may be, for example sixty minutes. Once this process is completed with the second tower 306 "on-line" and the first tower 304 "off-line", the appropriate valves are opened and the appropriate valves are closed to place the first tower 304 on-line and the second tower 306 off-line. With the first tower 304 on-line and the second tower 306 off-line, the regeneration, stripping and cooling modes of operation are again performed.

The compressed gas systems 100 and 300 of the present invention can incorporate either oil free compressors of the rotary screw or centrifugal variety. Unlike prior art compressors which simply provide a source gas inlet and a compressed cooled gas outlet, the compressor 101 of the present system 100, 300 provides a source gas inlet, a final stage/hot compressed gas outlet, a final stage/hot compressed gas inlet, and a cooled compressed gas outlet. Unlike prior art compressors which provide an inter stage compressed gas outlet and an inter stage compressed gas inlet, the present system 100, 300 provides a final stage compressed gas outlet 126 and a final stage compressed gas inlet 128. The final stage compressed gas outlet 126 along with the associated line 138 connects the final stage compressed gas outlet 126 to hot gas inlet of the dryer thereby providing one hundred percent (100%) of the hot compressed gas output from the compressor 101 to be provided to the dryer 102, 302. Thus, the hot gas is provided to the dryer 102, 302 where it is utilized to regenerate desiccant of the dryers 102, 302 prior to cooling of the final stage compressed gas.

The hot gas inlet 128 and associated return line 140 allows for the return of the compressed gas to the after-cooler 110 of the compressor 101 where the compressed gas can be cooled and provided to the cooled gas outlet 130 of the compressor 101. Utilization of the after-cooler 110 results in cost efficiencies and eliminates the need to provide an additional cooler associated with the dryer. Because the sensor 122 is provided downstream of the after-cooler 110, by utilizing the after-cooler 110 rather than simply disconnecting the after-cooler 110, the communication with the sensor 122 remains intact. With the sensor 122 intact, the first and second stage compressors 104, 106 continue to receive signals from the controller 112 in response to the information received from the sensor 122. In addition, because the after-cooler 110 is not removed from the compressor 101, operation of the fan 111 which is associated with the after-cooler 110 and the heat exchanger 106 is not impacted.

The improved compressed gas systems 100, 300 provide the ability for the heat-of-compression dryer to utilize gas compressed at the final stage of compression while also allowing use of the compressor after-cooler which provides an integral package which is easy to install, user friendly, and cost efficient.

While particular forms of the invention have been illustrated and described, it will be apparent that various modifications can be made without departing from the spirit and scope of the invention. Accordingly, it is not intended that the invention be limited except by the following claims.

We claim:

1. A compressor provided in combination with a regenerative dryer, the combination comprising:
   a compressor, the compressor further comprising;
   a source gas inlet;
   a first stage compressor in communication with said source gas inlet;
   a final stage compressed gas outlet;
   a final stage compressor in communication with said final stage compressed gas outlet and said first stage compressor;
   an after-cooler;
   a hot gas inlet in communication with said after-cooler;
   a cooled gas outlet in communication with said after-cooler; and
   a dryer, the dryer further comprising;
   a first desiccant tower;
   a second desiccant tower;
   a final stage compressed gas inlet in communication with said first desiccant tower and said final stage compressed gas outlet of the compressor;
   a hot gas outlet in communication with said first desiccant tower and said hot gas inlet of the compressor;
   a cool air inlet in communication with said second desiccant tower and said cooled gas outlet of the compressor;
   a dry air outlet in communication with said second desiccant tower; and
   a plurality of lines and valves for directing the gas flow through the dryer.

2. The combination of claim 1, wherein said valves provide for operation of the dryer in a regenerating mode.

3. The combination of claim 1, wherein said valves provide for operation of the dryer in a stripping mode.

4. The heat-of-compression dryer of claim 1, wherein said valves provide for operation of the dryer in a cooling mode.

5. A system of compressing and drying a gas comprising:
   a compressor having a first stage compressor, a first heat exchanger, a final stage compressor and an after-cooler;
   a dryer having a first desiccant tower and a second desiccant tower;
   wherein gas from said final stage compressor enters said first desiccant tower to regenerate desiccant provided therein, gas exiting said first desiccant tower is provided to said after-cooler of said compressor, and gas exiting said after-cooler is provided to said second desiccant tower to dry said gas utilizing desiccant provided therein.

6. The system of claim 5, wherein said compressor further comprises:
   a sensor downstream of said after-cooler; and
   a controller in communication with said first stage compressor and said final stage compressor, wherein said controller receives information from said sensor and provides drive signals to said first stage compressor and said final stage compressor in response to said information received.

7. The system of claim 5, wherein said compressor further comprises:
   a controller; and
   a fan associated with said heat exchanger and said after-cooler; and wherein said controller controls the operation of said fan.

8. The system of claim 5, wherein during a regenerating mode of operation, all of the gas exiting the final stage compressor is provided to said first desiccant tower.

9. The system of claim 5, wherein during a stripping mode of operation, gas exiting the final stage compressor is provided to the after-cooler, gas exiting the after-cooler is provided to the second desiccant tower, and a portion of the air exiting the second desiccant tower is provided to the first desiccant tower and exhausted to the atmosphere.

10. The system of claim 5, wherein during a cooling mode of operation, air exiting the final stage compressor is provided to the after-cooler, air exiting the after-cooler is provided to the second desiccant tower, and a portion of the gas exiting the second desiccant tower is provided to the first desiccant tower and gas exiting the first desiccant tower is provided in communication with gas exiting the second desiccant tower.

* * * * *